Figure 1:
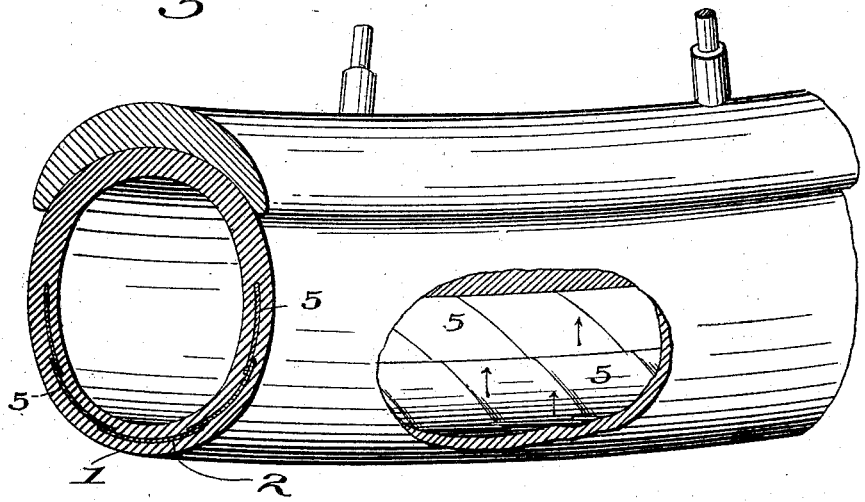

No. 608,075. Patented July 26, 1898.
E. J. PINE.
ARMOR FOR PNEUMATIC TIRES.
(Application filed Nov. 1, 1897.)
(No Model.)

Witnesses:
B. Kruse
C. H. Schafer

Inventor:
Edwin J. Pine
By his Atty. C. W. Reichel

UNITED STATES PATENT OFFICE.

EDWIN J. PINE, OF MOBILE, ALABAMA.

ARMOR FOR PNEUMATIC TIRES.

SPECIFICATION forming part of Letters Patent No. 608,075, dated July 26, 1898.

Application filed November 1, 1897. Serial No. 657,002. (No model.)

*To all whom it may concern:*

Be it known that I, EDWIN J. PINE, a citizen of the United States, residing at Mobile, in the county of Mobile and State of Alabama, have invented certain new and useful Improvements in Non-Puncturable Armor for Pneumatic Tires, of which the following is a specification.

This invention relates to a non-puncturable armor for pneumatic tires and pertains more specifically to a metallic armor formed of scales, the object of the invention being to provide a specially-constructed scale and arrangement of scales which shall when applied to the material of a pneumatic tire render the same puncture-proof and at the same time not add materially to the weight or affect the inherent elasticity thereof.

Heretofore scale-armors for pneumatic tires have been provided in which independent scales have been arranged to overlap each other, the lines of joinder of the scales extending transversely and longitudinally of the tread of the tire. This construction has been found faulty and has not come into public use for the reason that the scales being joined or overlapping in lines transverse to the tread of the tire there is opposed to the elasticity of the tire at points around the periphery thereof lines of overlapping plates forming four thicknesses of metal extending in a parallel line to the direction of indenture due to contact of the tire with the roadway. There have also been provided scales secured together in the form of a flexible plate; but by reason of the arched form of the tread of the tire the plates are held from movement with reference to each other and the plates act as an arch to withstand the pressure given the tire when indentured by the roadway. My invention has for its object to overcome these objections by arranging the lines of joinder of the scales in lines longitudinal and obliquely of the tread of the tire, the scales therefore being in the form of a rhomb or rhomboid, whereby the pressure exerted upon the transverse joinder of the scales by the indenture of the tire is progressively upon the said joinder and not directly longitudinally of the transverse joinder.

The invention therefore consists in the parts shown in the drawings, described in the specification, and more particularly pointed out in the claim.

Figure 2:
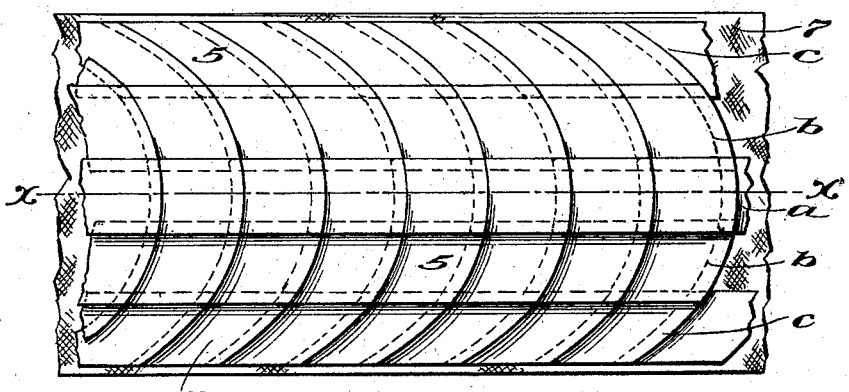
Figure 5:
Figure 4:
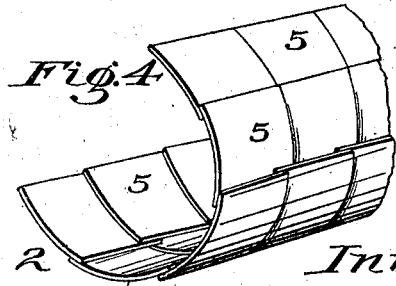
Figure 6:

In the drawings, Figure 1 is a perspective view of a portion of a bicycle-tire, a part being broken away to illustrate my improved armor applied thereto. Fig. 2 is a plan view of a section of the armor. Fig. 3 is a longitudinal sectional view of the armor, taken at a point indicated by the line X X, Fig. 2. Fig. 4 is a perspective view of a portion of the armor. Fig. 5 is a transverse sectional elevation of a tire, illustrating a modified means for securing my armor therein; and Fig. 6 is a detail view of one of the scales.

In carrying out my invention I secure in the material of the tread portion of the tire 1 an armor 2, composed of an inflexible non-puncturable material, such as aluminium, steel, or other light material of a minimum thickness. The armor is located in the material of the tread portion of the tire and is secured therein either during the process of molding the tire, as shown in Fig. 1, or the armor may be interposed between two sections 3 and 4, of which the tire may be composed, as shown in Fig. 5.

The armor 2 comprises a plurality of scales 5, arranged in rows extending longitudinally and obliquely to the tread of the tire. A complete armor preferably comprises five rows of scales—a central row $a$, central side rows $b$, and inner rows $c$—the scales comprising each row being lapped over the adjacent scales upon the forward end or at the end thereof coincident to the direction of travel of the wheel upon which the tire is utilized. The side edges of the row $a$ overlap the adjacent edge of the row $b$, and the inner edge of the row $b$ overlaps the outer edge of the row $c$, as shown more specifically in Fig. 4. Each scale is in the form of a rhomb or rhomboid, as shown in Fig. 6, except the row $a$, the ends of the scales of which are curved rearwardly from the longitudinal center to the edges thereof. (See Fig. 2.)

The preferred manner of manufacturing a tire having my improved armor secured therein is to secure the scales 5 upon a strip of canvas 7 and to mold the same within the tread portion of the tire.

By means of the oblique arched joinder of the scales, as described, the flexibility of a pneumatic tire using my armor is not impaired, and by the arrangement of lapping the edges of the scales, as described, the armor is absolutely puncture-proof, as will be seen by the arrows, Fig. 1, as a puncturing article will be caused to glance from one scale to the other and cannot under any possibility enter between the scales at the joinder thereof, the armor extending to the side of the tire to a point above the tread and the arched arrangement of the scales serving to reinforce the tire in the line of pressure and thus not materially affect the direct downward elasticity of the tire, which would be the effect if the plates were arranged in radial lines.

What I claim is—

A non-puncturable armor for pneumatic tires, comprising a plurality of rows of overlapping scales, each scale being in the form of a dished rhomb, the scales of the central row overlapping each other upon the end thereof coincident to the direction of travel of the tire, the scales of the said rows being arranged in arched segments receding from the direction of travel of the tire, substantially as described.

In testimony that I claim the foregoing as my invention I have signed my name in the presence of two subscribing witnesses.

EDWIN J. PINE.

Witnesses:
    B. KRUEPER,
    B. FERSTL.